United States Patent [19]
Heiser et al.

[11] Patent Number: 4,463,658
[45] Date of Patent: Aug. 7, 1984

[54] ARRANGEMENT FOR CONTROLLING THE LIFTING MECHANISM OF A TRACTOR OR A HARVESTER COMBINE

[75] Inventors: Joachim Heiser, Stuttgart; Walter Kobald, Schwieberdingen, both of Fed. Rep. of Germany

[73] Assignee: Robert Bosch GmbH, Stuttgart, Fed. Rep. of Germany

[21] Appl. No.: 196,294

[22] Filed: Oct. 14, 1980

Related U.S. Application Data

[63] Continuation of Ser. No. 915,067, Jun. 12, 1978, abandoned.

[30] Foreign Application Priority Data

Jul. 9, 1977 [DE] Fed. Rep. of Germany ....... 2731164

[51] Int. Cl.$^3$ ..................... F15B 9/00; F15B 13/042
[52] U.S. Cl. ........................... 91/388; 91/390; 91/461; 172/7
[58] Field of Search ............ 91/388, 390, 461; 172/4, 7, 9

[56] References Cited

U.S. PATENT DOCUMENTS

| | | |
|---|---|---|
| 2,750,862 | 6/1956 | Garmager . |
| 2,974,639 | 3/1961 | O'Connor et al. ............... 91/388 |
| 3,954,046 | 5/1976 | Stillhard ......................... 91/461 |
| 3,990,520 | 11/1976 | Koch et al. . |

FOREIGN PATENT DOCUMENTS

| | | |
|---|---|---|
| 1276959 | 9/1968 | Fed. Rep. of Germany . |
| 847656 | 9/1960 | United Kingdom . |

OTHER PUBLICATIONS

Final Report for German Ministry of Research and Technology.

*Primary Examiner*—Gerald A. Michalsky
*Attorney, Agent, or Firm*—Frishauf, Holtz, Goodman & Woodward

[57] ABSTRACT

An arrangement for controlling the lifting mechanism of a tractor or a harvester or a harvester combine comprising a hydraulic actuator (17) connected to the lifting mechanism and controlled by a control valve (19) leaving a hydraulically controlled spool arranged in the bridge diagonal (27-19-27') of a hydraulic bridge circuit (23, 24, 25, 26), in the bridge branches of which two actual force value transducers (41, 42) for generating hydraulic signals proportional to the position of the lifting mechanism and desired force value setting means (32, 52) are respectively located for controlling the hydraulically controlled valve (19). An additional control valve (33) or throttle unit (53a) is provided for selecting one or both of the actual force transducers and if desired for controllably mixing the actual force signals.

24 Claims, 4 Drawing Figures

Fig. 1

ARRANGEMENT FOR CONTROLLING THE LIFTING MECHANISM OF A TRACTOR OR A HARVESTER COMBINE

This is a continuation of application Ser. No. 915,067, filed June 12, 1978, now abandoned.

The present invention relates to an arrangement for controlling the lifting mechanism of tractors or harvester combines for example to control the position of a plough.

Background:

Hydraulic control units have been proposed in which hydraulically operated desired value setting means and actual value transducer means are provided which, like a hydraulic linkage, act on a valve controlling the hydraulic actuator of the tractor. This known arrangement also includes a control valve located between the aforementioned desired value setting and actual value setting means by which signals of two actual valve indicator means may selectively be brought into action. A disadvantage of this known arrangement is that the hydraulic linkage is not adapted for exactly regulating the lifting mechanism especially since in this arrangement columns of pressure fluid have to be shifted in relatively long signal conduits. The volume of the pressure fluid in the long signal conduit will change upon changes in temperature, which will disturb an exact response of the arrangement. Furthermore, this known arrangement is not suitable for mixing different actual value signals.

A hydraulic bridge circuit is also known in which four precontrolled valves are respectively arranged in the four branches of a bridge circuit and in which a servomotor is arranged in the bridge diagonal. Two proportionally working pressure regulating valves are provided for precontrolling the valves in the four bridge branches in which each of the pressure regulating valves acts on two valves located in opposite bridge branches. In this known arrangement the bridge circuit is provided for a working circuit and not for a control circuit and this known arrangement is not used for regulating the lifting mechanism of a tractor or the like.

The Invention

It is an object of the present invention to provide an arrangement for controlling the lifting mechanism of a tractor or the like comprising a hydraulic working circuit and a hydraulic control circuit for hydraulically transmitting signals of actual force value transducer means and desired force value setting means in the control circuit to a hydraulically operated valve in the working circuit which controls the lifting mechanism. It is a further object of the present invention to provide such a control circuit which will assure quick and exact operation of the hydraulically controlled valve in the working circuit.

A hydraulic working circuit is provided, including a hydraulic actuator, a source of pressure fluid and a control valve between the source and the actuator and having a hydraulically controlled spool movable between a neutral position blocking flow of fluid between the source and the actuator and two working positions in which pressure fluid is fed into, or, respectively discharged or drained from the actuator. A hydraulic control circuit is provided for moving the hydraulically operated spool of the valve between the positions thereof, in which the control circuit is in the form of a bridge circuit having a plurality of bridge branches and a bridge diagonal in which the hydraulically operated valve spool is located and in which desired force value setting means are located in one of the bridge branches to produce hydraulic signal proportional to the desired force while another of the bridge branches is divided in at least two parallel conduits with an actual force value transducer means arranged in each of the two conduits to produce hydraulic signals corresponding to actual forces on the lifting mechanism and means in the other bridge branch upstream of the actual force value transducer means for mixing signals provided by the actual force value transducer means.

The aforementioned mixing means may comprise a control valve, or in a preferred arrangement two adjustable throttles respectively located in the aforementioned two conduits and common adjusting means for the two throttles constructed to reduce during adjustment the open cross-section of one of the two throttles while simultaneously increasing the open cross-section of the other of the two throttles and vice versa, which will assure a very simple mixing of the signals.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is a schematic diagram of a first embodiment of an arrangement according to the present invention for controlling a lifting mechanism of an agricultural machine such as a tractor or the like.

DESCRIPTION OF THE PREFERRED EMBODIMENTS

Figure 1:
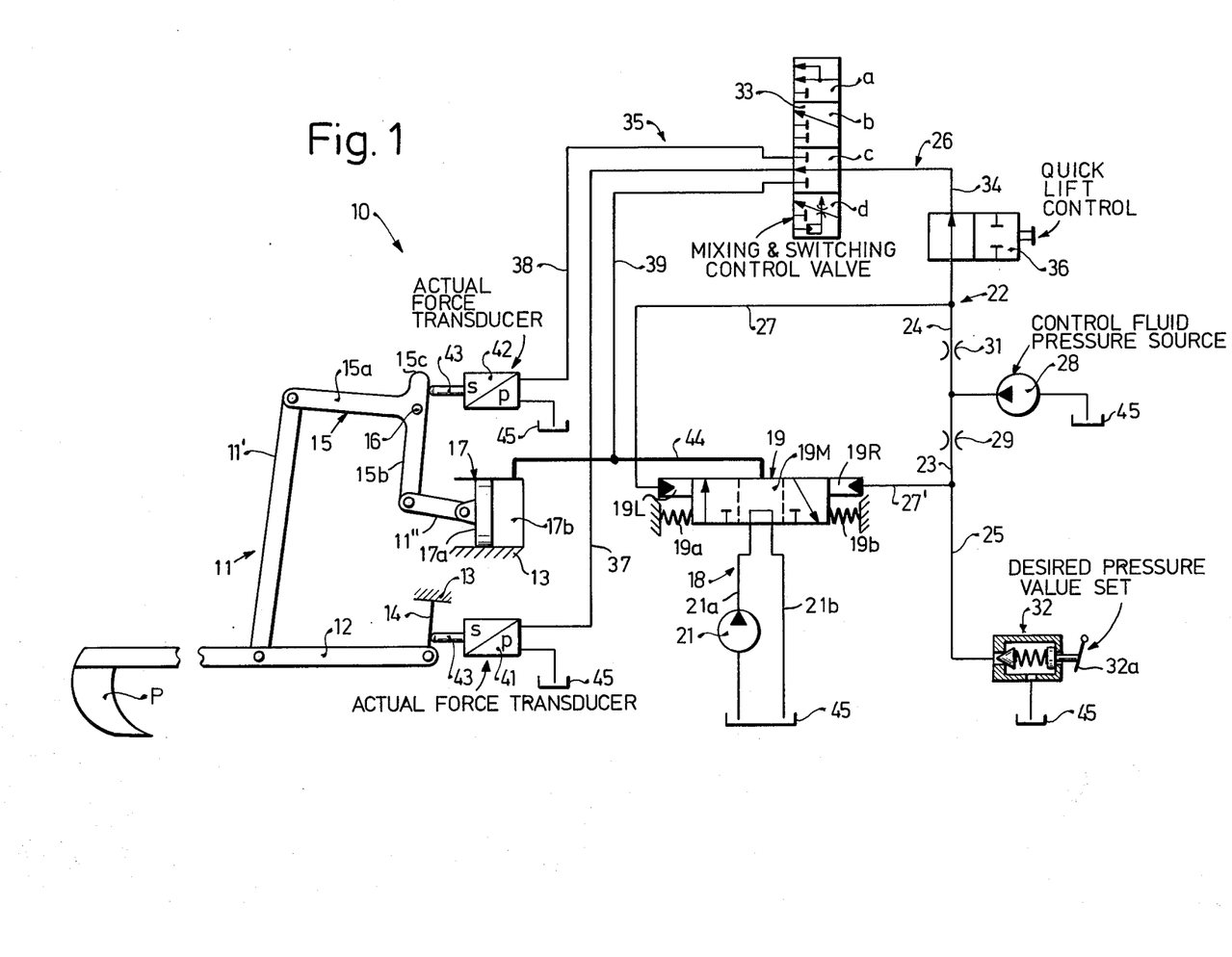

FIG. 1 schematically illustrates an arrangement 10 for regulating the movement of the control linkage 11 which is pivotably supported at three points on a tractor. The control linkage 11 comprises a lower guide bar 12 which is movably supported by means of a leaf spring 14 on the housing 13 of the tractor. The linkage 11 comprises further an upper guide bar 15, formed as a multi-arm lever having arms 15a, 15b, 15c pivotably mounted intermediate its ends and as shown at the junctions of the arms, for pivoting movement about a pivot 16 provided on the aforementioned housing and which is connected by a link 11' to the lower guide bar 12 and by a link 11'' and to a hydraulic actuator 17 also provided on the housing 13. Actuator 17 has a piston 17a operable in a cylinder 17b. The lower guide bar 12 may carry at its front end for instance a plow P which has to be lifted or lowered in response to the arrangement according to the present invention. The cylinder of the hydraulic actuator 17 is connected to a hydraulic working circuit 18 which includes a pump 21 for feeding pressure fluid from a tank or reservoir 45 into the hydraulic working circuit, and a hydraulically operated three-port, three-position valve 19 having a spool or valve member 19M in the hydraulic working circuit between the pump 21 and the hydraulic actuator. The valve is a spool valve, in which the spool is maintained centered by springs 19a, 19b. The valve 19 is hydraulically operated by pressure fluid in conduits 27 and 27' which feed pressure fluid to respective faces of the spool of the valve 19 from part of a control circuit 22 of the arrangement. The control circuit 22 is constructed as a bridge circuit and has four bridge branches 23, 24, 25 and 26, as well as a bridge diagonal 27 and 27' in which the aforementioned valve 19 is located. An additional source of pressure fluid 28 communicates with the control circuit 22 at the junction of the first bridge branch 23 with the second bridge branch 24 and a constant throttle 29 is located in the first and constant throttle 31 in the second bridge branch. A desired pressure value setting means 32 including, as shown in FIG. 1, a spring biassed valve member, in which the biasing force of the spring may be adjusted by a handle 32a by the operator to the desired value, is located in the third bridge branch 25 of the bridge connected to the junction of the first bridge branch 23 with the bridge diagonal conduit 27'. The fourth bridge branch 26 connected to the junction of the second bridge branch 24 and the bridge diagonal conduit 27 is divided by a four-port, four-position control valve 33 providing for switching and mixing of hydraulic fluid into an upstream section 34 and a downstream section 35. A quick lifting control member 36 is located in the upstream section 34 of the fourth bridge branch 26. This quick lifting control member is constituted by a two-port, two-position valve which in one position, as shown in FIG. 1, permits flow of fluid through the fourth bridge branch 26 and which in the other position prevents such flow. The downstream section 35 of the fourth bridge branch 26 comprises a first conduit 37, a second conduit 38 and a third conduit 39. A first actual force transducer 41, constructed as a displacement-to-pressire converter producing hydraulic signals p depending on the pulling force s applied by the tractor, is located in the first conduit 37. A second actual force transducer 42 transducing the positions s of the element 15 operated by the lifting mechanism into pressure signals p, is located in the second conduit 38. For this purpose, the two actual force transducer means 41 and 42 are each provided with a pin or feeler 43 by means of which they respectively sense movements or displacements s of the leaf spring 14 and the upper guide bar 15, respectively. The third conduit 39 is directly connected with a working fluid conduit 44 which connects the valve 19 with the hydraulic actuator 17 and senses pressure-dependent signals.

Operation:

Assuming the arrangement 10 is in equilibrium and the valve 19 is in the position as shown in FIG. 1 the control chambers 19R and 19L at the end faces of the spool 19M of valve 19 are at equal pressure. The pressure fluid pumped by the pump 21 flows through line 21a to valve 19, and directly back to the tank 45 through line 21b. The hydraulic actuator 17 is blocked. At the same time pressure fluid from the source 28 of control pressure fluid flows over the bridge branches 23, 25 to the tank 45. Control pressure fluid also flows through branch 24, the quick lifting control member 36, which normally is in the position shown in FIG. 1 and branch 26 and through the control valve 33. Valve 33 is in the position c in which only the first actual force transducer 41 responsive to the pulling force applied on the bar 12 is connected into the control circuit 22. The desired value setting means 32, and the first actual force transducer 41, on the other hand, will produce equal pressures, which act equally at both sides of the bridge diagonal 27. The spool of the valve 19 thus will remain in the position shown in FIG. 1, blocking the working conduit 44.

A change in the pulling force acting on the lower guide bar 12 will change the position of the leaf spring 14 causing a corresponding movement on the feeler 43 of the transducer 41, and therewith a change of the pressure in the first conduit 37 of branch 26 which is throttled by the first actual force transducer 41. The thus produced pressure difference at the bridge diagonal conduit 27 will cause shifting of the spool of the valve 19 from its neutral position to a working position producing flow of pressure fluid from the pressure fluid source 21 to the hydraulic actuator 17 or flow of pressure fluid out of the spool of the latter. As a consequence, the plow P on the guide bar 12 is lifted or lowered until the changing pulling force acting on the lower guide bar 12 and detected by the first actual force transducer 41 brings about a condition of equilibrium in the hydraulic bridge of the control circuit 22. It is therefore possible to control the pulling force acting on the lower guide bar 12 according to the desired pessure signal to which the desired value setting means 32 is adjusted.

By moving the spool of control valve 33 to the positions b or d shown in FIG. 1, it is possible to regulate correspondingly the position of the linkage 11 in response to the hydraulic signal from the second actual force indicator 42 or the pressure in the hydraulic actuator 17 in response to the pressure in working conduit 44. By moving the control valve 33 to the position a it is also possible to mix the hydraulic signals generated by the first and second actual force transducer means 41 and 42. By moving the spool of valve 36 from the position shown in FIG. 1 to the other position it is possible to block the fourth bridge branch 26 and to obtain in this way a quick lifting of the lower guide bar 12, for instance to obtain a quick lifting of the plow P connected thereto during turning of the tractor at the edge of a field.

Figure 2:
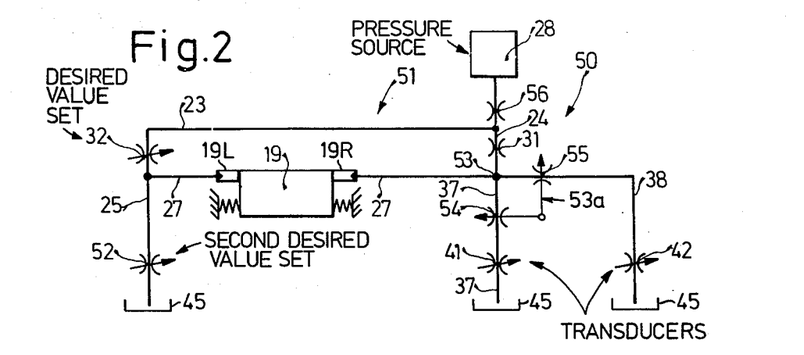
FIGS. 2-4 respectively illustrate the control circuit of a second, a third and fourth embodiment according to the present invention.

FIG. 2 schematically illustrates the control circuit 51 of a second embodiment 50. The same reference numerals are used for indicating corresponding elements of the control circuit.

In the control circuit 31 shown in FIG. 2 the desired force setting means 32, shown as a controllable throttle is located in the first bridge branch 23. A second desired force setting means 52 likewise shown as a controllable throttle is located in the third bridge branch 25. The throttle of constant cross-section 31 is located in the second bridge branch 24. The first actual force transducer 41 is located in the conduit 37 and the second position depending actual force transducer 42 is located in the conduit 38. Transducers 41, 42 act hydraulically as controlled throttles, as shown. In each of the conduits 37 and 38 which are connected at a point 53 with each other and with the second bridge branch 24 as well as with the bridge diagonal 27, is a mixing throttle unit 53a, namely the variable throttles 54 and 55 located between the junction point 53 and the actual force transducers 41 and 42. Both mixing throttles 54 and 55 of mixing unit 53a are mechanically coupled in such a manner that they will be operated in opposition, or push-pull, that is when the open cross-section of one of the mixing throttles is increased, the open cross-section of the other mixing throttle is simultaneously decreased and vice versa. The first bridge branch 23 and the second bridge branch 24 are connected via a second throttle 56 of constant cross-section with the pressure source 28 which supplies a constant volume of pressure fluid with constant pressure.

The operation of the control circuit 51 corresponds in principle largely to the control circuit 22 shown in FIG. 1. It differs therefrom however that, with the second desired force setting means 52, a second desired force value may be applied. For example, depending on the slip of the wheels of the tractor, the hydraulic actuator 17 may be controlled in such a manner that, during increase of the slip, the hydraulic actuator 17 will, for instance, lift the plow P connected to the lower guide bar 12 so as to prevent overloading of the motor of the tractor. Furthermore, by means of the two mixing throttles 54 and 55 working in opposition to each other it is possible to control the desired relationship of the pulling force, as transduced by the first actual force value transducer 41 or the plow position, as transduced by the second actual force value transducer 42.

Figure 3:
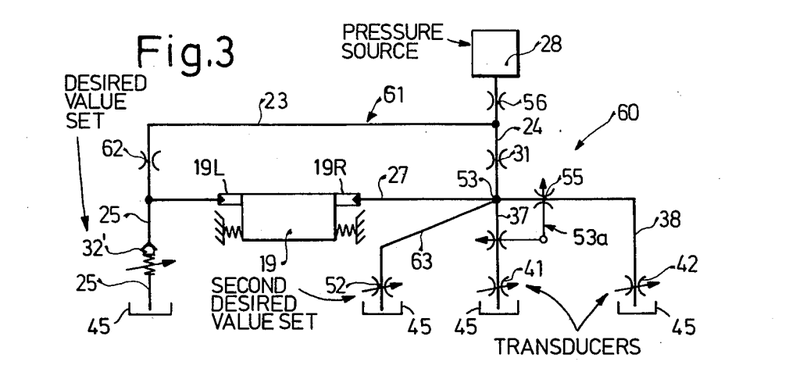

FIG. 3: schematically illustrates the control In the control circuit 61 of system 60 a constant throttle 62 is arranged in the first bridge branch 23, whereas the first desired force value setting means, constructed as an adjustable pressure limiting valve 32', is provided in the third bridge branch 25. The second desired force value setting means 52 is located in a control conduit which leads from the point 53 to the tank. The operation of the control circuit 61 is substantially identical to that of the control circuit 51 shown in FIG. 2.

Figure 4:
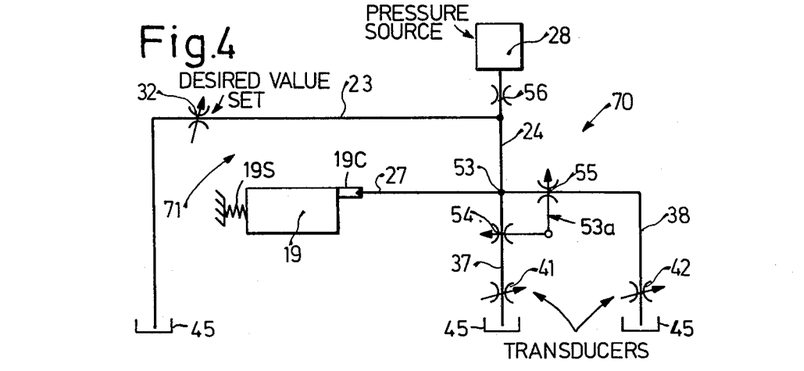

FIG. 4 shows as part of a fourth arrangement 70 a control circuit 71 which is constructed as a half bridge. The valve 19 is only supplied with pressure fluid connected to one chamber 19c from the point 53 over the half bridge diagonal 27 in opposition to the force of a spring 19S. The constant throttle 31 is eliminated and the first bridge branch 23, in which the desired value setting means 32 is located, leads directly to the tank 45. In principle the control circuit 71 shown in FIG. 4 operates in the same manner as the control circuit 51 according to FIG. 2, but its construction is considerably simpler.

While FIGS. 2–4 illustrate only the control circuits of the respective arrangements 50, 60 or 70, it is to be understood that each of these arrangements comprises also a working circuit 18 as shown in FIG. 1, including a pump 21 for feeding fluid under pressure from the tank 45 into the valve 19 and a hydraulic actuator 17 connected by a working conduit 44 to the valve 19.

It will be understood that each of the elements described above, or two or more together, may also find a useful application in other types of arrangements for controlling the lifting mechanism of tractors or the like, differing from the types described above.

While the invention has been illustrated and described as embodied in an arrangement for controlling the lifting mechanism of a tractor or harvester combine comprising a hydraulic actuator connected to the lifting mechanism and controlled by a hydraulically controlled valve arranged in the bridge diagonal of a hydraulic bridge circuit, it is not intended to be limited to the details shown, since various modifications and structural changes may be made without departing in any way from the spirit of the present invention.

Thus, for instance, it is also possible instead of the single first actual value transducer 41 to provide two parallel or series connected actual value transducers which cooperate respectively with two lower guide bars provided on the tractor. Furthermore, it is also possible in order to tune the control circuit to provide further constant throttles. Additional mixing throttles which may work in the same sense or in opposition to each other may also, in special cases, be advantageously used.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letter Patent is set forth in the appended claims:

1. Arrangement for controlling a lifting mechanism (11) of a tractor or the like comprising
   a hydraulic working circuit (17, 18, 19, 21, 44) including a hydraulic
   a source of a pressure fluid (21) and a control valve (19) between said source of the actuator and having a hydraulically controlled valve member (19M) movable between a neutral position blocking flow of fluid between said source and said actuator and two working positions in which the pressure fluid is fed into and, respectively, discharged from said actuator;
   and a hydraulic circuit (22) for moving said hydraulically controlled valve member between said positions thereof, said hydraulic control circuit being in form of at least a half bridge circuit and having
   a source (28) of pressure fluid
   a plurality of branches (23, 24, 25, 26),
   a bridge diagonal (27-19-27') in which said control valve (19) is located to respond to pressure conditions in said branches, and
   desired-force-setting means (32; 52) in one (FIGS. 1 and 3: 25; FIGS. 2 and 4: 23) of said bridge branches for pesetting a pressure in said one branch according to a desired force to be applied to said lifting mechanism,
   another of said bridge branches being divided into at least two parallel conduits (37, 38, 39),
   a first actual position and force transducer means (41) responsive to a first position and force component in one (37) of said conduits, and a second actual position-and-force transducer means (42) responsive to a second position and force component in a second one (38) of said conduits for controlling the pressure in the assigned conduit in dependence on the actual force applied on the part of said lifting mechanism (11);
   two throttles (29, 31) arranged in said bridge circuit for balancing hydraulic pressures controlled by said desired-force-setting means and said actual force transducer means;
   and switching and mixing means (33) in said other bridge branch (FIG. 1: 26; FIGS. 2, 3, 4: 53, 37, 38) for selectively switching and mixing signals provided by said first and second actual force transducer means.

2. Arrangement as defined in claim 1, further including operator actuated control valve means (36) in said other bridge branch (26; 53, 37, 38) upstream of said switching and mixing means (33) for fast operation of said lifting mechanism.

3. Arrangement as defined in claim 1, wherein said lifting mechanism includes a control linkage (11) having a lower guide bar (12), a leaf spring (14) connected at one end to one end of said lower guide bar and at the other end to a housing of the tractor, an upper guide bar (15) pivotable about a fixed pivot point (16) and articulated connected to said lower guide bar and said actuator, said first and said second actual force transducer means being in the form of a displacement-to-pressure converter (41, 42) having each an operating member (43) respectively engaging said leaf spring (14) and said upper guide bar (15).

4. Arrangement as defined in claim 1, wherein said switching and mixing means (33) is formed by a control valve.

5. Arrangement as defined in claim 1, wherein said control valve (33) is a four-port, four-position valve.

6. Arrangement as defined in claim 1, wherein said first actual position-and-force transducer means (41) is responsive to pulling force exerted by the tractor on a pulled implement, and the second actual position-and-force transducer means (42) is responsive to position of the pulled implement with respect to the tractor;

and wherein said switching and mixing means is operator-controllable for selective proportionately mixing said hydraulic signals based on selected priority determined by the operator of either: pulling force; implement position.

7. Arrangement for controlling a lifting mechanism of a tractor or the like comprising a hydraulic circuit (17, 18, 19, 21, 44) including a hydraulic actuator (17);

a source of pressure fluid (21) and a control valve (19) between said source and the actuator and having a hydraulically controlled valve member (19M) movable between a neutral position blocking flow of fluid between said source and said actuator and two working positions in which pressure fluid is fed into and, respectively, discharged from said actuator;

a desired-force-setting means (32, 52) for presetting a hydraulic pressure level according to a desired force to be applied to said lifting mechanism;

an actual position-force-transducer means (41, 42) responsive to actual force applied to said lifting mechanism;

and a hydraulic control circuit (22; 23, 24, 25, 26) for hydraulic signal processing and for moving said hydraulically operated controlled valve member between said positions thereof, hydraulically coupled to said desired force setting means and further hydraulically coupled to said actual position and force transducing means wherein the actual position-and-force transducer means comprises a first actual position-and-force transducer (41) responsive to a first actual position and force component and providing a first actual hydraulic position-and-force signal;

a second actual position-and-force transducer means (42) responsive to a second actual position-and-force component and providing a second actual hydraulic position-and-force signal;

and wherein controlled mixing means (33) are provided, controllably mixing the hydraulic signals provided by the first and second transducer means to derive a combined actual position-and-force hydraulic signal selectively representative of said first and second force components in respective selected proportions;

said combined actual position-and-force signal being hydraulically connected to said hydraulic control circuit, said hydraulic control circuit moving said hydraulically operated controlled valve member in accordance with deviations of said combined actual position-and-force signal from a hydraulic signal derived from the desired-force-setting means.

8. Arrangement as defined in claim 7, wherein said hydraulic control circuit comprises two branches (25, 26);

said desired-force-setting means being connected to one of said branches (25) of the control circuit and the actual position-force-transducer means (42, 42) being connected to the other one (26) of said branches.

9. Arrangement as defined in claim 7, wherein said control circuit comprises two branches (25, 26) and the desired-force-setting means (32, 52) is connected to one (25) of said branches;

and wherein the other branch (26) includes two hydraulic lines (37, 38), a first one (37) of said hydraulic lines being connected to the first actual position-and-force transducer means (41), the second one of said lines (38) being connected to the second position-and-force transducer means (42), and said lines being connected to said mixing means (33).

10. Arrangement as defined in claim 7, wherein said mixing means comprises a controlled mixer mixing hydraulic signals provided by the first and second actual position-and-force transducer means in push-pull opposition.

11. Arrangement as defined in claim 7, wherein said first actual position-and-force transducer means (41) is responsive to pulling force exerted by the tractor on a pulled implement, and the second actual position-and-force transducer means (42) is responsive to position of the pulled implement with respect to the tractor;

wherein said switching and mixing means (33) is operator-controllable for selective proportionately mixing said hydraulic signals based on selected priority determined by the operator of either: pulling force; implement position;

and wherein said mixing means comprises a controlled mixer mixing hydraulic signals provided by the first and second actual position-and-force transducer means in push-pull opposition.

12. A hydraulic control arrangement for positioning an implement (P) comprising a source (21) of operating fluid under pressure;

a hydraulic positioner (17);

a pressure line connecting said source to said positioner;

a fluid-operated three-position selector valve (19) in said pressure line movable between a neutral position connecting said source to a reservoir (45) and two operating positions, in one of which said source is connected to said positioner to move the latter in one direction, and in the other of which said positioner is connected to the reservoir so as to move in said other direction.

said selector valve including spring means (19a, 19b) tending to maintain the same in said neutral position and two opposite pilot chambers for respectively moving said selector valve to either one of its operating positions;

mechanical means (11; 11', 15, 16, 11", 12, 14) connecting said positioner to said implement (P);

a source (28) of control fluid under pressure;

a first control line (23, 27') connecting said source of control fluid to one of said pilot chambers;

a fixed throttle (29) and an operator controlled adjustable throttle (32) cooperating therewith in said first control line for producing a predetermined pressure according to the setting of said adjustable throttle, said predetermined pressure being fed to said one pilot chamber tending thereby to move said selector valve from said neutral to one of said operating positions;

and feedback means comprising a second control line (24, 27) connecting said source (28) of control fluid to the other of said pilot chambers, and a second fixed throttle (31) and at least one adjustable throttle (41, 42) cooperating therewith and adjusted by engagement with said mechanical means (11) operated by said positioner (17), wherein said feedback means comprises two adjustable throttles (41, 42) cooperating with said second fixed throttle (31) and respectively adjusted by different portions (12; 11', 15, 11") of said mechanical means, and a mixing valve (33) in said second control line (24, 26) between said second fixed throttle (31) and said two adjustable throttles (41, 42) cooperating therewith and having a mixing position for mixing the feedback signals produced by said two adjustable throttles.

13. A hydraulic control arrangement as defined in claim 12, wherein said mixing valve (33) is a two-port three-position valve having in addition to said mixing position (a) two end positions (b, c) to opposite sides of said mixing position, in which in one of said end positions (b) said second fixed throttle (31) cooperates with one of said adjustable throttles (42) in said second control line, and in the other end position (c) said second fixed throttle (31) cooperates with the other (41) of said adjustable throttles in said second control line, and operator-controlled means for shifting said mixing valve between said positions thereof.

14. A hydraulic control arrangement as defined in claim 12, wherein each of said adjustable throttles (41, 42) comprises means connected to a respective control line and having an outlet opening and means (43) controlling fluid flow to said outlet opening.

15. A hydraulic control arrangement as defined in claim 14, wherein said means for controlling fluid flow from said outlet opening of one (41) of the adjustable throttles (41, 42) of the feedback means comprises a lever (14, 15) tiltably mounted at one end and engaged in the region of the other end by a portion (12, 15) of said mechanical means, and actuating means (43) fixed to said lever intermediate the ends of the latter, and forming part of said fluid flow controlling means.

16. A hydraulic control arrangement as defined in claim 15, wherein said lever (14) is constituted by a spring (14) clamped at said one end to a fixed element (13).

17. A hydraulic control arrangement as defined in claim 6, wherein said actuating means (43) is mounted on said spring (14) at a distance from said clamped end which is shorter than the distance of said actuating means from the region of said other end of said spring (14) which is engaged by a portion (12) of said mechanical means (11).

18. A hydraulic control arrangement for positioning an implement (P) comprising a source (21) of operating fluid under pressure;

a hydraulic positioner (17);

a pressure line connecting said source to said positioner;

a fluid-operated three-position selected valve (19) in said pressure line movable between a neutral position connecting said source to a reservoir (45) and two operating positions, in one of which said source is connected to said positioner to move the latter in one direction, and in the other of which said positioner is connected to the reservoir so as to move in said other direction, said selector valve including spring means (19a, 19b) tending to maintain the same in said neutral position and two opposite pilot chambers for respectively moving said selector valve to either one of its operating positions;

mechanical means (11;11',15,16,11",12,14) connecting said positioner to said implement (P);

a source (28) of control fluid under pressure;

a first control line (23, 27') connecting said source of control fluid to one of said pilot chambers;

a fixed throttle (29) and an operator controlled adjustable throttle (32) cooperating therewith in said first control line for producing a predetermined pressure according to the setting of said adjustable throttle, said predetermined pressure being fed to said one pilot chamber tending threby to move said selector valve from said neutral to one of said positions;

and feedback means comprising a second control line (24, 27) connecting said source (28) of control fluid to the other of said pilot chambers, and a second fixed throttle (31) and at least one adjustable throttle (41, 42) cooperating therewith and adjusted by engagement with said mechanical means (11) operated by said positioner (17), wherein two adjustable throttles (41, 42) are provided in said second control line (24, 26), and at least one of the throttles includes spring means (14) connected to said adjustable throttles for urging the same to a position closing the respective inlet port (37) and actuating means (43) acting on said throttles in opposition to said spring means, the actuating means for the adjustable throttle (32) in said first control line (29, 25) being operator-controlled, and the actuating means (43) in said second control line (24, 26) being controlled by engagement with different portions (12; 11', 15) of said mechanical means (11).

19. A hydraulic control arrangement as defined in claim 18, wherein said means controlling fluid flow to said outlet opening of said operator controlled adjustable throttle (32) comprises a lever (32a) pivotally connected at one end to a fixed pivot axis and having at the other end an operating portion to be actuated by an operator, and means for adjusting the flow of fluid fixed to said lever intermediate the ends of the latter.

20. A hydraulic control arrangement as defined in claim 19, wherein said means for adjusting the flow of fluid is connected to said lever (32a) at a distance from said pivot axis which is shorter than the distance of said means for adjusting the flow of the fluid from said operating portion.

21. A hydraulic control arrangement for positioning an implement (P) comprising
- a source (21) of operating fluid under pressure;
- a hydraulic positioner (17);
- a pressure line connecting said source to said positioner;
- a fluid-operated three-position selector valve (19) in said pressure line movable between a neutral position connecting said source to a reservoir (45) and two operating positions, in one of which said source is connected to said positioner to move the latter in one direction, and in the other of which said positioner is connected to the reservoir so as to move in said other direction,
- said selector valve including spring means (19a, 19b) tending to maintain the same in said neutral position and two opposite pilot chambers for respectively moving said selector valve to either one of its operating positions;
- mechanical means (11;11',15,16,11'',12,14) connecting said positioner to said implement (P);
- a source (28) of control fluid under pressure;
- a first control line (23, 27') connecting said source of control fluid to one of said pilot chambers;
- a fixed throttle (29) and an operator controlled adjustable throttle (32) cooperating therewith in said first control line for producing a predetermined pressure according to the setting of said adjustable throttle, said predetermined pressure being fed to said one pilot chamber tending thereby to move said selector valve from said neutral to one of said positions;
- and feedback means comprising
- a second control line (24, 27) connecting said source (28) of control fluid to the other of said pilot chambers, and
- a second fixed throttle (31) and at least one adjustable throttle (41, 42) cooperating therewith and adjusted by engagement with said mechanical means (11) operated by said positioner (17),
- wherein said feedback means comprises two adjustable throttles (41, 42) adjusted by different portions (12; 11', 15) of said mechanical means (11) and including a fluid line connecting the outlet ports of said two adjustable throttles to a reservoir (45), and
- a two-position valve (36) in the fluid circuit (34, 35, 38, 37) having an open and closed position.

22. Arrangement for controlling a lifting mechanism of a tractor or the like comprising
- a hydraulic working circuit (17, 18, 19, 21, 44) including a hydraulic actuator (17);
- a source of pressure fluid (21) and a control valve (19) between said source and the actuator and having a hydraulically controlled valve member (19M) movable between a neutral position blocking flow of fluid between said source and said actuator and two working positions in which pressure fluid is fed into and, respectively, discharged from said actuator;
- a desired-force-setting means (32, 52) for presetting a hydraulic pressure level according to a desired force to be applied to said lifting mechanism;
- an actual position-force-transducer means (41, 42) responsive to actual force applied to said lifting mechanism;
- and a hydraulic control circuit (22; 23, 24, 25, 26) for hydraulic signal processing and for moving said hydraulically operated controlled valve member between said positions thereof, hydraulically coupled to said desired force setting means and further hydraulically coupled to said actual position and force transducing means
- wherein the actual position-and-force transducer means comprises
- a first actual position-and-force transducer (41) responsive to a first actual position and force component and providing a first actual hydraulic position-and-force signal;
- a second actual position-and-force transducer means (42) responsive to a second actual position-and-force component and providing a second actual hydraulic position-and-force signal;
- and wherein controlled mixing means (33) are provided, controllably mixing the hydraulic signals provided by the first and second transducer means to derive a combined actual position-and-force hydraulic signal selectively representative of said first and second force components in respective selected proportions;
- said combined actual position-and-force signal being hydraulically connected to said hydraulic control circuit, said hydraulic control circuit moving said hydraulically operated controlled valve member in accordance with deviations of at least one of said actual position-and-force signals forming part of said combined signal from a hydraulic signal derived from the desired force-setting means.

23. Arrangement according to claim 22, wherein said hydraulic control circuit moves said hydraulically operated controlled valve member in accordance with deviations of both of said first and second position-and-force signals from the hydraulic signal derived from the desired force-setting means.

24. Arrangement according to claim 22, wherein said control circuit comprises two branches (25, 26) and the desired force-setting means (32, 52) is connected to one (25) of said branches;
- and wherein the other branch (26) includes two hydraulic lines (37, 38), a first one (37) of said hydraulic lines being connected to the first actual position-and-force transducer means (41), the second one of said lines (38) being connected to the second position-and-force transducer means (42), and
- said lines being connected to said mixing means (33).

* * * * *

UNITED STATES PATENT AND TRADEMARK OFFICE
CERTIFICATE OF CORRECTION

PATENT NO. : 4,463,658

DATED : August 7, 1984

INVENTOR(S) : Joachim HEISER et al

It is certified that error appears in the above-identified patent and that said Letters Patent is hereby corrected as shown below:

Column 4, line 23, change "pessure" to -- pressure --

CLAIM 1, line 4, (column 6, line 19) change "hydraulic" to -- hydraulic actuator (17) --

17, line 2 (column 9, line 66) change "claim 6" to -- claim 16 --

Signed and Sealed this

Sixth Day of May 1986

[SEAL]

Attest:

DONALD J. QUIGG

Attesting Officer

Commissioner of Patents and Trademarks

UNITED STATES PATENT AND TRADEMARK OFFICE
CERTIFICATE OF CORRECTION

PATENT NO. : 4,463,658

DATED : August 7, 1984

INVENTOR(S) : Joachim Heiser et al

It is certified that error appears in the above-identified patent and that said Letters Patent is hereby corrected as shown below:

Column 5, line 21, "schematically illustrates the control" should be deleted.

Signed and Sealed this

Tenth Day of June 1986

[SEAL]

Attest:

DONALD J. QUIGG

Attesting Officer

Commissioner of Patents and Trademarks